US009350769B2

(12) United States Patent
Smith et al.

(10) Patent No.: US 9,350,769 B2
(45) Date of Patent: May 24, 2016

(54) SIP DEVICE-LEVEL CALL/SESSION/SERVICE MANAGEMENT

(75) Inventors: Joan Smith, Ottawa (CA); Brian Lindsay, Ottawa (CA); Dany Sylvain, Gatineau (CA)

(73) Assignee: GENBAND US LLC, Plano, TX (US)

( * ) Notice: Subject to any disclaimer, the term of this patent is extended or adjusted under 35 U.S.C. 154(b) by 390 days.

(21) Appl. No.: 13/045,479

(22) Filed: Mar. 10, 2011

(65) Prior Publication Data
US 2012/0233327 A1   Sep. 13, 2012

(51) Int. Cl.
*G06F 15/173*   (2006.01)
*H04L 29/06*   (2006.01)

(52) U.S. Cl.
CPC ........ *H04L 65/1073* (2013.01); *H04L 65/1006* (2013.01)

(58) Field of Classification Search
CPC ...................... H04L 65/1006; H04L 65/1073
USPC .................................. 709/203, 224, 225, 226
See application file for complete search history.

(56) References Cited

U.S. PATENT DOCUMENTS

| 8,813,062 | B1 | 8/2014 | Eminovic et al. | |
| 2003/0200298 | A1* | 10/2003 | Su et al. | 709/223 |
| 2006/0067244 | A1* | 3/2006 | Sekaran et al. | 370/252 |
| 2010/0070525 | A1* | 3/2010 | Clark et al. | 707/769 |
| 2010/0241748 | A1* | 9/2010 | Ansari et al. | 709/225 |

OTHER PUBLICATIONS

Salgueiro et al., "Format for the Session Initiation Protocol (SIP) Common Log Format (CLF)," SIPCLF Internet Draft (Mar. 14, 2011).
Jennings et al., "Managing Client-Initiated Connections in the Session Initiation Protocol (SIP)," Network Working Group, RFC 5626 (Oct. 2009).
Rosenberg et al., "SIP: Session Initiation Protocol," Network Working Group, RFC 3261 (Jun. 2002).
Jennings et al., "Managing Client-Initiated Connections in the Session Initiation Protocol (SIP)," Network Working Group, RFC 5626 (2009).
Rosenberg et al., "SIP: Session Initiation Protocol," Network Working Group, RFC 3261 (2002).

* cited by examiner

*Primary Examiner* — Hua Fan
*Assistant Examiner* — Normin Abedin
(74) *Attorney, Agent, or Firm* — Fogarty, L.L.C.

(57) ABSTRACT

Systems, methods, and computer readable media for session initiation protocol (SIP) device-level call/session/service management are disclosed. According to one aspect, a system for SIP device-level management includes a SIP service node that makes available to a user the unique device identifier of a SIP device, where the SIP device is one of multiple devices that register using the same SIP identity, and that allows the user to use the unique device identifier to manage calls, sessions, or services on a SIP device-level basis, which may include performing screening, routing, or logging operations. In one embodiment, the SIP service node is configured to receive SIP device-level management rules for managing SIP calls, sessions, or services on a SIP device-level basis and to use the rules to manage calls, sessions, or services on a SIP device-level basis.

21 Claims, 11 Drawing Sheets

SIP DEVICE-LEVEL CALL/SESSION/SERVICE MANAGEMENT

TECHNICAL FIELD

The subject matter described herein relates to systems and methods for managing calls, sessions, and services in a telecommunications network. More particularly, the subject matter described herein relates to systems, methods, and computer readable media for session initiation protocol device-level call, session, and service management.

BACKGROUND

The session initiation protocol (SIP) is an internet engineering task force (IETF)-defined signaling protocol for controlling multimedia communication sessions, such as voice and video calls, over packet networks, such as networks that use the Internet protocol (IP). The SIP protocol is an application layer protocol designed to be independent of the underlying transport layer, which may be the transmission control protocol (TCP), the user datagram protocol (UDP), or the stream control transmission protocol (SCTP), for example. SIP is a text-based protocol. SIP can be used for creating, modifying and terminating sessions between two or more parties. A session may include one or more media streams. SIP has been accepted as a 3rd generation partnership project (3GPP) signaling protocol and is a key standard of the IP Multimedia Subsystem (IMS) architecture for IP-based streaming multimedia services in fixed/mobile convergent (FMC) systems. SIP may be the underlying protocol for voice-over-IP (VoIP) service, which allows users to make telephone calls via a packet network such as the Internet rather than through the traditional public switched telephone network, or PSTN.

In one example, a home or small business may use VoIP as the primary (or only) means of telephone service. A home, for example, may have VoIP telephones in several different locations, e.g., separate telephones in the kitchen, den, parents' room, etc. In these scenarios, it is common that the home or small business is configured so that all VoIP telephones share the same SIP identity, in which case there are multiple devices, e.g., not only VoIP telephones but also softclients running on computers, tablets, smartphones, etc., that all register using the same SIP identity. FIG. 1 illustrates such a scenario.

FIG. 1 is a block diagram illustrating a conventional communication environment that includes multiple SIP devices having the same SIP identity. In FIG. 1, a home or office includes three SIP devices 100, 102, and 104 which register with a service node 110 and which communicate through service node 110 to the outside world. Each SIP device is associated with the same identity, which in the example illustrated in FIG. 1 is "userA@domain". In this manner, all registered user devices that are associated with the same identity receive incoming call or session requests, analogous to the operation of traditional home telephones, where an incoming call causes all of the telephones in the house to ring.

However, there are limitations to this arrangement. Conventional service nodes such as service node 110 are configured with call management rules on a per-identity basis, not on a per-device basis. For example, service node 110 may be configured for call management rules, but these rules will apply uniformly to each of SIP devices 100, 102, and 104. Another limitation is that services provided by the service node apply equally to each SIP devices. For example, once an incoming call is answered by one of the SIP devices 100, 102, or 104, there is no mechanism to transfer the call or session to a specific device associated with the same identity. Yet another limitation is the granularity of reports. For example system call logs, such as those that may be maintained by service node 110, do not identify which of SIP devices 100, 102, or 104 placed or answered the call.

It would be desirable to provide systems and methods that would allow multiple SIP devices to continue to be associated with the same identity yet allow device-level management capabilities such as: per device call management rules, device-to-device transfer, and log files that identify which device was involved with which activity. Accordingly, there exists a need for systems, methods, and computer readable media for SIP device-level call/session/service management.

SUMMARY

According to one aspect, a system for session initiation protocol (SIP) device-level management. The system includes a SIP service node that makes available to a user the unique device identifier of a SIP device, where the SIP device is one of multiple devices that register using the same SIP identity, and that allows the user to use the unique device identifier to manage calls, sessions, or services on a SIP device-level basis.

As used herein, the term "SIP device-level management" includes management of calls, sessions, or services on a SIP device-level basis.

As used herein, the term "user" may refer to an owner, administrator, or user of a SIP identity.

According to another aspect, the subject matter described herein includes a method for SIP device-level management. The method includes, a SIP service node, making available to a user a unique device identifier of a SIP device, where the SIP device is one of multiple devices that register using the same SIP identity, and allowing the user to use the unique device identifier to manage calls, sessions, or services on a SIP device-level basis.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for session initiation protocol device-level call, session, and/or service management.

Reference will now be made in detail to exemplary embodiments of the present invention, examples of which are illustrated in the accompanying drawings. Wherever possible, the same reference numbers will be used throughout the drawings to refer to the same or like parts.

Figure 1:
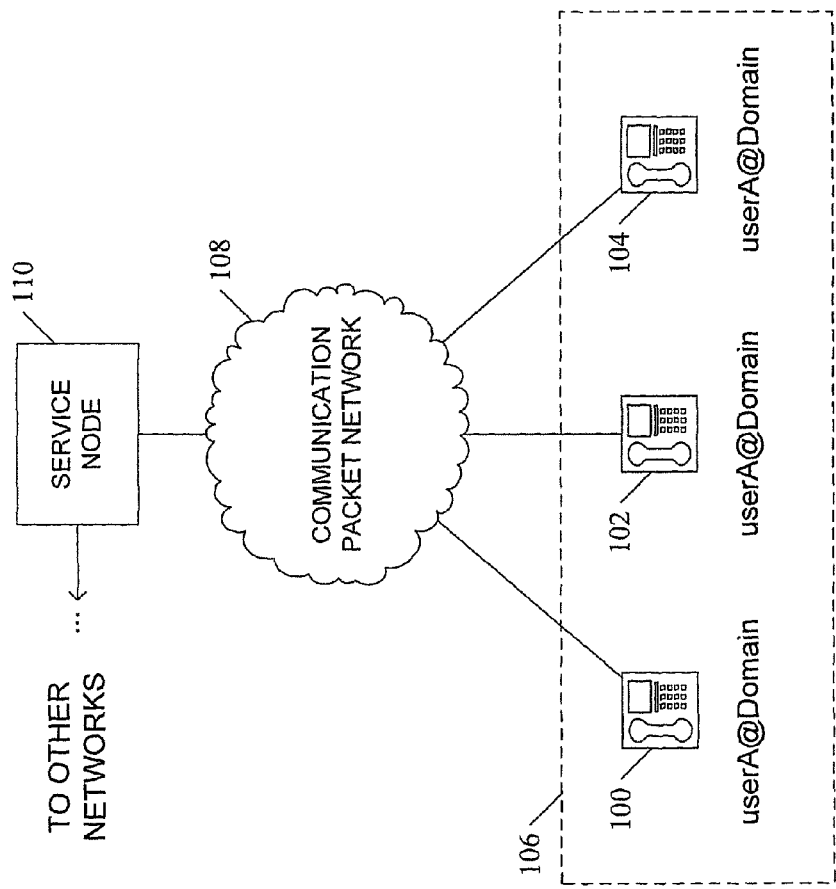
FIG. 1 is a block diagram illustrating a conventional communication environment that includes multiple SIP devices having the same SIP identity.
Figure 2:
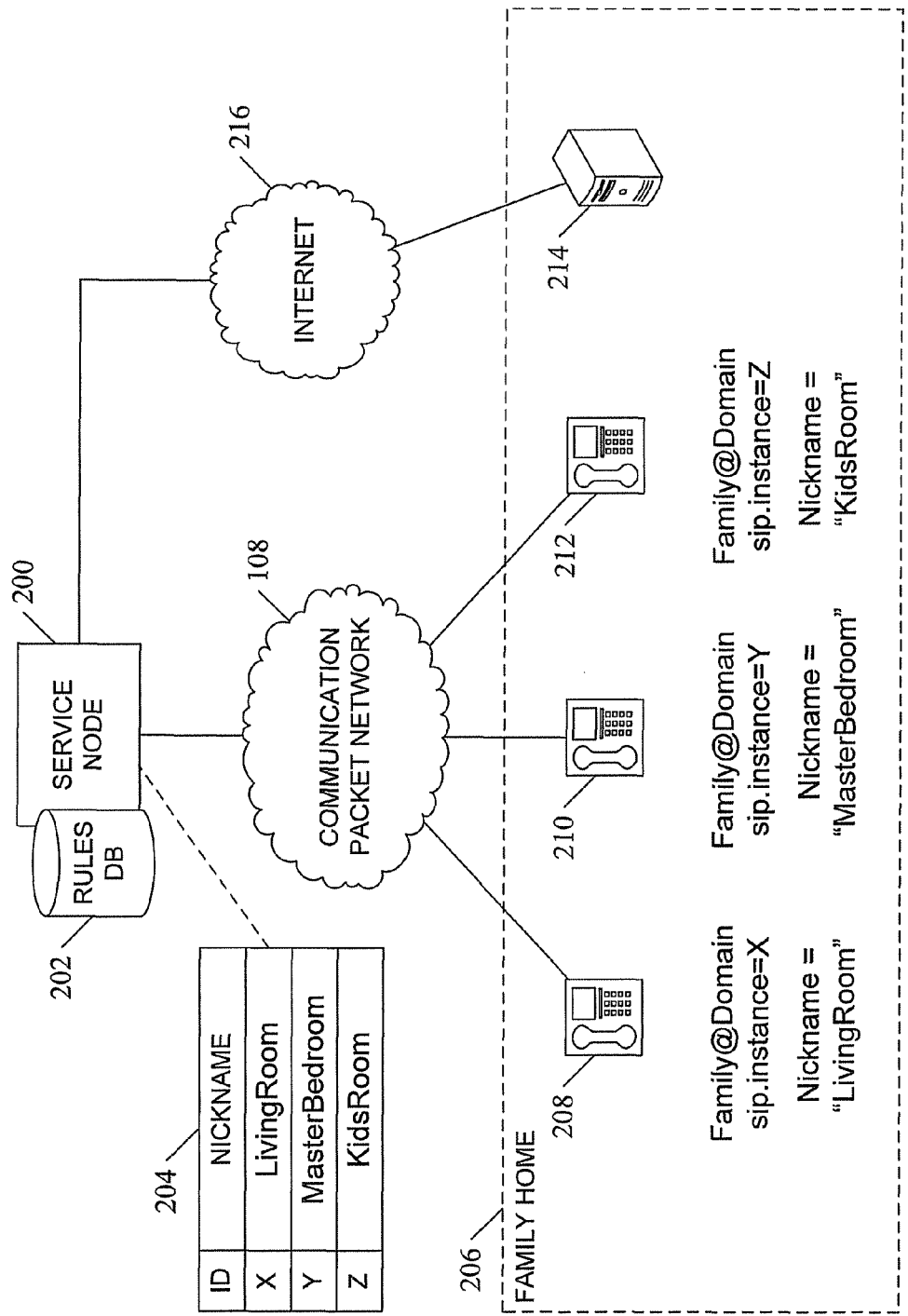
FIG. 2 is a block diagram illustrating an exemplary system for SIP device-level call/session/service management according to an embodiment of the subject matter described herein.

FIG. 2 is a block diagram illustrating an exemplary system for SIP device-level management according to an embodiment of the subject matter described herein. The enhanced service node 200 makes available to a user the unique device identifier of a SIP device. The SIP device may be one of multiple devices that all register with service node 200 using the same SIP identity. Service node 200 allows the user to use the unique device identifiers to manage calls, sessions, and/or services on a SIP device-level basis. In one embodiment, service node 200 may be configured with SIP device-level management rules for managing SIP calls, sessions, or services on a SIP device-level basis.

In one embodiment, service node 200 may allow an owner, administrator, or user of a SIP identity to create unique, user-defined nicknames for SIP devices associated with that SIP identity. These nicknames may also be used in SIP device-level management rules created by the user or preexisting in service node 200. For example, the use of nicknames allows service node 200 to produce log files or other forms of device and traffic information that identify the SIP devices by user-readable or user-friendly labels.

In one embodiment, the SIP device-level management rules may include customized routing or screening rules that are maintained and applied by service node 200 to devices associated with the SIP identity. For brevity, the entity with authority to create user-defined nicknames and/or modify the management rules that service node 200 applies to devices associated with a SIP identity is hereinafter referred to as the owner of the SIP identity, or simply, "the owner."

In the embodiment illustrated in FIG. 2, service node 200 uses a rules database 202 for storing SIP device-level management and routing rules and a nickname table 204 for storing the association of user-defined nickname to a device identity. FIG. 2 illustrates an embodiment in which a family home 206 has multiple SIP devices that share the same SIP identity "Family@Domain". Example SIP devices include, but are not limited to, VoIP telephones and soft clients. Soft clients are software applications that provide VoIP service, and are typically executed on a personal computer or other computing device that can connect to the Internet or other IP network. Examples of SIP identities include, but are not limited to, an IP multimedia public identity (IMPU), a session initiation protocol uniform resource identifier (SIP URI), a secure SIP URI (SIPS URI), and other URI schemes.

In the embodiment illustrated in FIG. 2, service node 200 provides service to several SIP devices 208, 210, and 212 within family home 206 via a communication packet network 108. Service node 200 may be accessed via a terminal, such as a personal computer 214 within family home 206, which communicates with service node 200 via the Internet 216. The owner of family home 206 may use a personal computer, such as personal computer 214, to define nicknames for each SIP device within the family home, which are stored in a nickname table 204 on service node 200. Table 1, below, shows the contents of an example nickname table 204 for the system illustrated in FIG. 2.

TABLE 1

Example Nicknames for Family Home

| SIP Instance | Nickname |
| --- | --- |
| X | LivingRoom |
| Y | MasterBedroom |
| Z | KidsRoom |

In one embodiment, the owner may then define management rules based on those nicknames. These rules may be stored in a rules database 202 located within or accessible by service node 200. Table 2, below, shows example management rules that may be stored in rules database 202 and applied to family home 206 illustrated in FIG. 2.

TABLE 2

Example Management Rules for Household

| # | Condition(s) | Action |
| --- | --- | --- |
| 1 | Weekdays, 8:00~16:00 | Route incoming calls to voice mail |
| 2 | Weekdays, 16:00~20:00 | Route incoming calls to all devices |
| 3 | 20:00~23:00 | Route incoming calls to MasterBedroom |
| 4 | Weekdays, 16:00~17:00 | Block outgoing calls from KidsRoom |

For example, rule #1 redirects incoming calls to voice mail during the work day. According to rule #2, during the evening on weekdays, incoming calls are sent to all devices, e.g., all of the VoIP telephones ring. Rule #3 routes all incoming calls received late in the evening to the master bedroom only. Rule #4 blocks outgoing calls from the kids room during weekdays between 4:00 PM and 5:00 PM, e.g., to bar children from making telephone calls when they are supposed to be working on homework. In this manner, the owner may configure service node 200 to use user-specified nicknames and management rules.

As used herein, the term "ring" refers to any manner by which a device can go into an alerting state, e.g., to alert the user of an incoming call, session, service, message, etc. A device may generate an alert, such as an audible alert, a visual alert, a tactile alert (e.g., vibration), or other type of alert, in any combination. For example, a VoIP telephone may generate a ringtone and/or may vibrate, a softclient may generate an alert tone and/or display a visual indication, and the like.

In one embodiment, the owner may use an application hosted by service node 200. For example, the owner may use a web browser program executing on computer 214 to access a web page hosted by service node 200. From this web page, service node 200 may present the owner with a list of SIP instance identifiers known by service node 200 to be associated with the owner's SIP identity. In the embodiment illustrated in FIG. 2, three SIP devices have registered with service node 200: SIP device 208, which has an instance identifier "X"; SIP device 210, which has an instance identifier "Y"; and SIP device 212, which has an instance identifier "Z".

As used herein, the term "instance identifier" refers to information that uniquely identifies a device. One example of an instance identifier is the value of the "sip.instance" media feature tag which appears as a "+sip.instance" contact header field parameter. This is a uniform resource name (URN) that universally and uniquely identifies this specific user agent (UA) instance. The sip.instance parameter uniquely identifies the source of packets received by service node 200 and is also used by service node 200 to send SIP packets to individual SIP devices. The sip.instance defined in IETF RFC 5626 can be used. Other kinds of information that uniquely identify a device may be used as instance identifiers.

The owner may then assign user-friendly or human-readable nicknames to the devices. In the embodiment illustrated in FIG. 2, sip.instance X has been assigned the nickname "LivingRoom", sip.instance Y has been assigned the nickname "MasterBedroom", and sip.instance Z has been assigned the nickname "KidsRoom", reflecting the physical location of the SIP device in the home. In one embodiment, the owner may use the web page hosted by service node 200 to then create routing rules or other kinds of call, session, or service management rules that use the nicknames.

In an alternative embodiment, the nicknames and/or management rules may be created offline, e.g., on a node other than service node 200, and later uploaded to or otherwise transferred into service node 200.

In one embodiment, service node 200 may be flexibly configured to log information for incoming and outgoing calls, including generating call logs that identify the particular SIP device that placed or received a call, and identifying the SIP device by its nickname. Table 3, below, is an example of a call log according to one embodiment of the subject matter described herein.

TABLE 3

Example Call Log

| Call Type | Date | Time | Calling Party | Device |
|---|---|---|---|---|
| Incoming | 11/8 | 12:23 | userB | LivingRoom |
| Incoming | 11/8 | 15:44 | userC | MasterBedroom |
| Outgoing | 11/8 | 19:00 | userD | KidsRoom |
| Incoming | 11/8 | 22:17 | userE | MasterBedroom |

In one embodiment, service node 200 may include in the call log file information identifying which rule was applied to a particular call, to assist the owner in debugging or enhancing the management rules.

Figure 3:
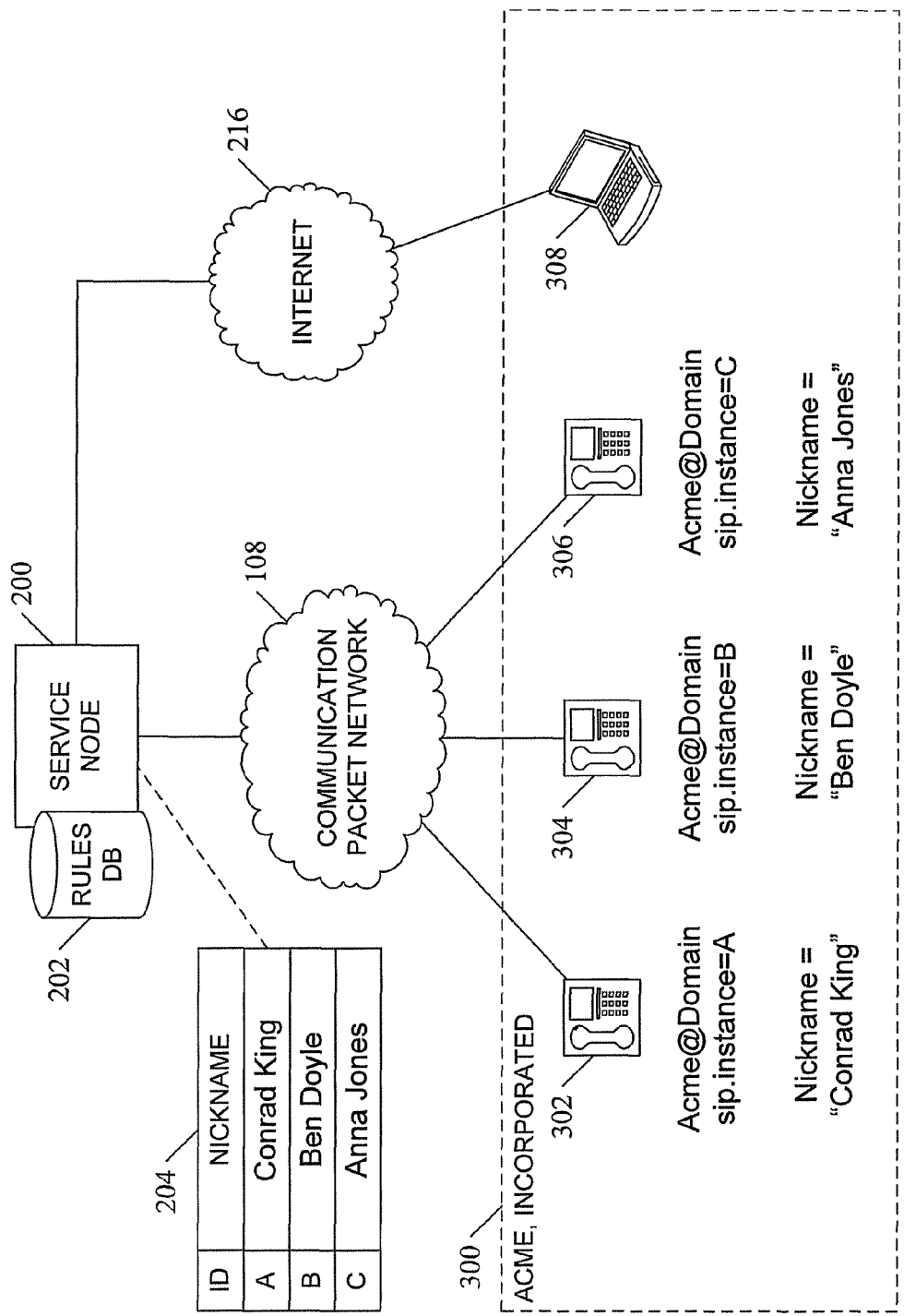
FIG. 3 is a block diagram illustrating an exemplary system for SIP device-level call/session/service management according to another embodiment of the subject matter described herein.

FIG. 3 is a block diagram illustrating an exemplary system for SIP device-level management according to another embodiment of the subject matter described herein. FIG. 3 illustrates an embodiment in which the SIP identity owner is a business entity, Acme Incorporated 300, having three salespeople: Conrad King, who uses VoIP telephone 302; Ben Doyle, who uses VoIP telephone 304; and Anna Jones, who uses VoIP telephone 306. Each SIP device within the Acme business 300 shares the same SIP identity, "Acme@Domain". Example SIP devices include, but are not limited to, VoIP telephones and soft clients.

In the embodiment illustrated in FIG. 3, service node 200 may be configured to assign nicknames to SIP instance identifiers according to Table 4, below:

TABLE 4

Example Nicknames for Business

| SIP Instance | Nickname |
|---|---|
| A | Conrad King |
| B | Ben Doyle |
| C | Anna Jones |

The SIP device-level management rules contained within rules database 202 in FIG. 3 may consider any number of conditions. For example, routing may be based on the calling party, as shown in the example routing rules listed in Table 5, below:

TABLE 5

Example Management Rules for Business

| # | Condition(s) | Action |
|---|---|---|
| 1 | Caller = Customer 1 | Route incoming calls to Anna Jones |
| 2 | Caller = Customer 2 | Route incoming calls to Ben Doyle |
| 3 | Caller = Customer 3 | Route incoming calls to Conrad King |
| 4 | !(Weekdays, 08:00~18:00) | Send to voice mail |
| 5 | Default | Send to all SIP devices |

In Table 5, above, rule #1 detects calls from Anna Jones' customer and routes them to Anna Jones's telephone 306. Rules #2 and #3 similarly route customer calls to the telephone of the salesperson assigned to that customer. Rule #4 sends incoming calls that are received after hours to voice mail. If none of the above rules apply, service node 200 is configured to send incoming calls to everyone in the office by default. Unlike conventional systems, in which SIP INVITE messages are always sent to all devices that are associated with the SIP identity, service node 200 may be configured to respond to an incoming call by sending SIP INVITE messages to a subset of the devices that are associated with the SIP identity, rather than to all of the devices that are associated with the SIP identity.

In the embodiment illustrated in FIG. 3, service node 200 may be accessed via a terminal, such as a desktop or laptop computer 308, which communicates with service node 200 via the Internet 216. The owner of the SIP identity may use laptop computer 308 to define nicknames for each SIP device associated with the Acme@Domain SIP identity, which are stored in a nickname table 204 on service node 200.

In one embodiment, the owner may use an application hosted by service node 200. For example, the owner may use a web browser program executing on laptop computer 308 to access a web page hosted by service node 200. From this web page, the owner may create human-readable nicknames, which may then be used to generate logs and reports that use the assigned nicknames to identify by nickname which SIP devices sent or received a call, to list statistics about traffic or use for each SIP device, and so on. Where the nickname for a device is the name of the user of that device, for example, traffic and use reports can identify the traffic generated by each user. In one embodiment, the owner may also use the application hosted by service node 200 to create management rules that use the nicknames. Alternatively, the nicknames and/or management rules may be created offline, e.g., on a node other than service node 200, and later uploaded to or otherwise transferred into service node 200.

Figure 4:
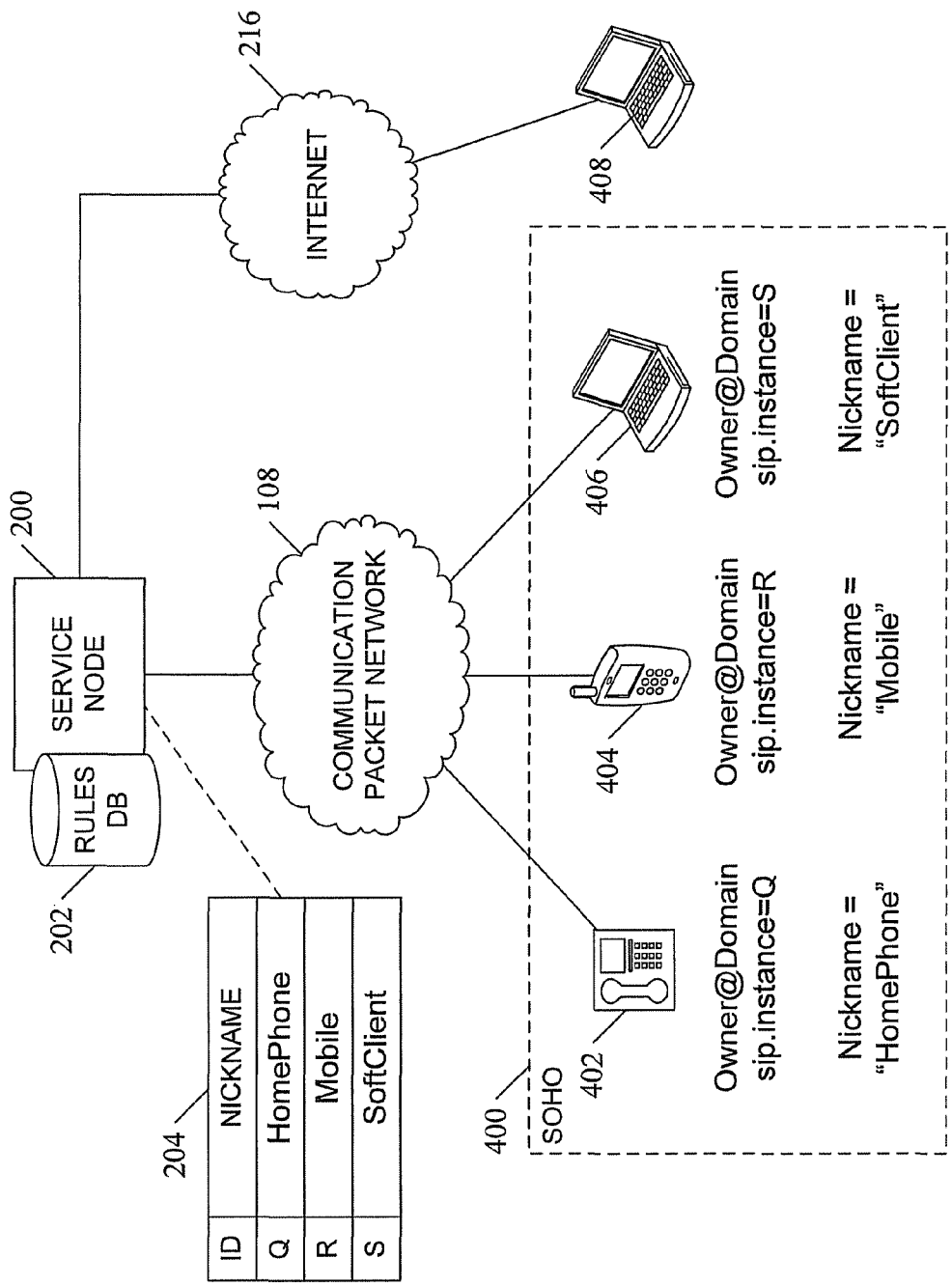
FIG. 4 is a block diagram illustrating an exemplary system for SIP device-level call/session/service management according to yet another embodiment of the subject matter described herein.

FIG. 4 is a block diagram illustrating an exemplary system for SIP device-level management according to yet another embodiment of the subject matter described herein. FIG. 4 illustrates an embodiment in which a SIP identity is associated with a collection of various devices that a single person (or group of persons) may use. In the embodiment illustrated in FIG. 4, a sole proprietor who is operating a small business from his home, referred to herein as a small office/home office (SOHO), uses three SIP entities within the SOHO 400, including a home telephone 402, a mobile telephone 404, and a VoIP application 406 executing on a laptop, all of which share the same SIP identity "Owner@Domain". Example SIP entities include, but are not limited to, VoIP telephones and soft clients.

In the embodiment illustrated in FIG. 4, service node 200 may be configured to assign nicknames to SIP instance identifiers according to Table 6, below:

TABLE 6

Example Nicknames for Multidevice User

| SIP Instance | Nickname |
|---|---|
| Q | HomePhone |
| R | Mobile |
| S | SoftClient |

The embodiment illustrated in FIG. 4 highlights the fact that service node 200 may be configured from an entity, such as a laptop computer 408, that is not co-located with the devices. Such remote access may employ additional levels of security, such as authentication, authorization, and encryption, to prevent unauthorized access to service node 200 or to allow only authorized users to modify the nicknames and SIP device-level management rules pertaining to devices that share a particular SIP identity. In one embodiment, laptop computer 408 has a web browser and is used to assign the nicknames of the SIP entities.

In one embodiment, service node 200 may contain multiple groups of nicknames and management rules, each group of management rules and nicknames pertaining to a particular SIP identity.

The management rules contained within rules database 202 in FIG. 4 may consider any number of conditions. For example, routing may be based on the time of day, type of call/session, and/or calling party, as shown in the example routing rules listed in Table 7, below:

TABLE 7

Example Management Rules for Multidevice User

| # | Condition(s) | Action |
|---|---|---|
| 1 | 09:00~17:00 | Route incoming calls to Mobile |
| 2 | 17:00~09:00 | Try HomePhone; if no answer, try Mobile |
| 3 | Video Call | Route calls to SoftClient |
| 4 | Caller = wife | Route incoming calls to all devices simultaneously and apply special alerting tone |

In Table 7, above, rule #1 routes incoming calls received during working hours to the user's mobile phone 404. For calls received outside of working hours, rule #2 directs service node 200 to first try the home telephone 402, but if nobody answers, try the user's mobile phone 404 instead. Rule #3 allows incoming video calls to be handled by the user's soft client 406, which supports video calls, for example. Rule #4 detects calls from a high-priority source and causes all available devices to ring simultaneously using a special alerting tone or ring sound.

Figure 5:
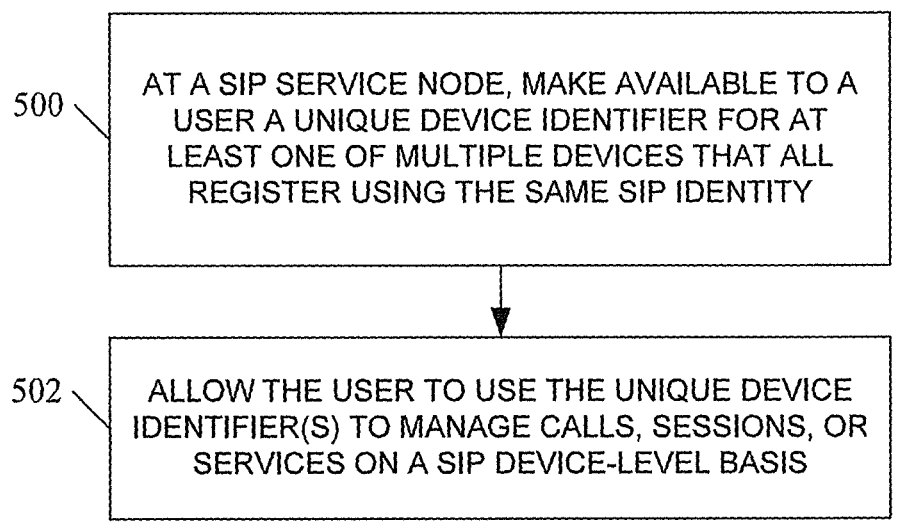
FIG. 5 is a flow chart illustrating an exemplary process for session initiation protocol device-level management according to an embodiment of the subject matter described herein.

FIG. 5 is a flow chart illustrating an exemplary process for session initiation protocol device-level management according to an embodiment of the subject matter described herein. At block 500, the method includes, at a SIP service node, making available to a user a unique device identifier for at least one of multiple devices that all register using the same SIP identity. For example, in FIG. 2, service node 200 may make available to a user the unique device identifiers for one or more of SIP devices 208, 210, and 212. As will be described in more detail below, in one embodiment, the SIP service node may merely allow the user to see the unique device identifiers, while in another embodiment, the SIP service node may allow the user to assign a user-friendly nickname to one or more of the devices that register using the same SIP identity. At block 502, the SIP service node allows the user to use the unique device identifier(s) to manage calls, sessions, or services on a SIP device-level basis. For example, SIP service node 200 may allow a user to view call logs which include the identities of the individual SIP devices rather than just the same SIP identity shared by all of the devices. This allows a user to determine which of the multiple devices actually placed or received a call, established a session, or used a service. In one embodiment, SIP service node 200 may allow the user to define custom call management rules for call, session, and/or service management. These rules may identify SIP devices or groups of SIP devices, and may identify them by unique device identifiers, by user-defined nickname, or both.

Figure 6:
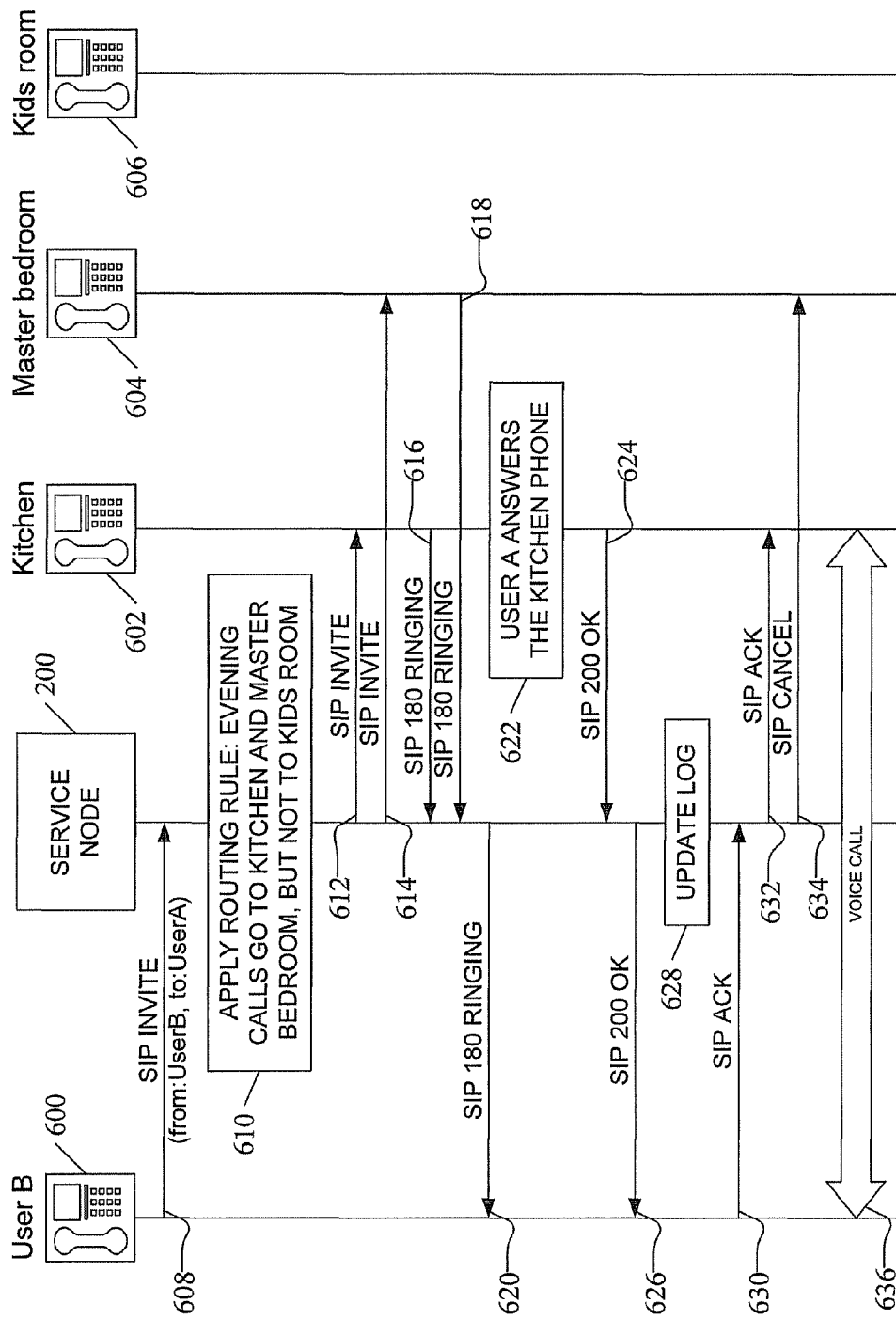
FIG. 6 is a message flow diagram showing exemplary signals exchanged between components of a system for providing SIP device-level call/session/service management according to another embodiment of the subject matter described herein.

FIG. 6 is a message flow diagram showing example signals exchanged between components of a system for providing SIP device-level management according to another embodiment of the subject matter described herein. FIG. 6 illustrates an embodiment in which user B uses a SIP device 600 to place a call to the home of user A. User A is the owner of a home that includes three telephones, a kitchen telephone 602, a master bedroom telephone 604, and a kids' room telephone 606.

The process starts when user B, SIP device 600 issues a SIP INVITE 608 from user B to user A. SIP INVITE 608 is received by service node 200. At block 610, service node 200 applies the call management rule that calls received in the evening go to kitchen telephone 602 and master bedroom telephone 604, but not to kids' room telephone 606. According to that rule, service node 200 issues a SIP INVITE 612 to kitchen telephone 602 and issues another SIP INVITE 614 to master bedroom telephone 604, but does not issue a SIP INVITE to kids' room telephone 606. Both kitchen telephone 602 and master bedroom telephone 604 respond by sending SIP 180 RINGING messages 616 and 618 respectively to service node 200. In the embodiment illustrated in FIG. 6, service node 200 forwards a SIP 180 RINGING message 620 to SIP device 600. Service node 200 may be configured to forward to SIP device 600 all SIP 180 RINGING messages received from SIP devices associated with the SIP identity, or service node 200 may be configured to aggregate the multiple SIP 180 RINGING responses into a single SIP 180 RINGING message, as shown in FIG. 6. Service node 200 and SIP devices 600 and 602 may also be configured to send other SIP messages, such as the provisional response acknowledgement (PRACK) and corresponding 200 OK PRACK messages, etc.

In the embodiment illustrated in FIG. 6, at block 622, user A answers the kitchen telephone, which causes kitchen telephone 602 to issue a SIP 200 OK message 624 to service node 200. Service node 200 sends a SIP 200 OK message 626 to SIP device 600. At block 628, service node 200 logs the fact that the call was answered using kitchen telephone 602. SIP device 600 responds to SIP 200 OK message 626 with a SIP ACK message 630. Service node 200 receives SIP ACK message 630, and forwards it as SIP ACK message 632 to kitchen telephone 602 and sends a SIP CANCEL message 634 to master bedroom telephone 604. A voice call 636 is thereby established between user B, on SIP device 600, and user A, on kitchen telephone 602.

Figure 7:
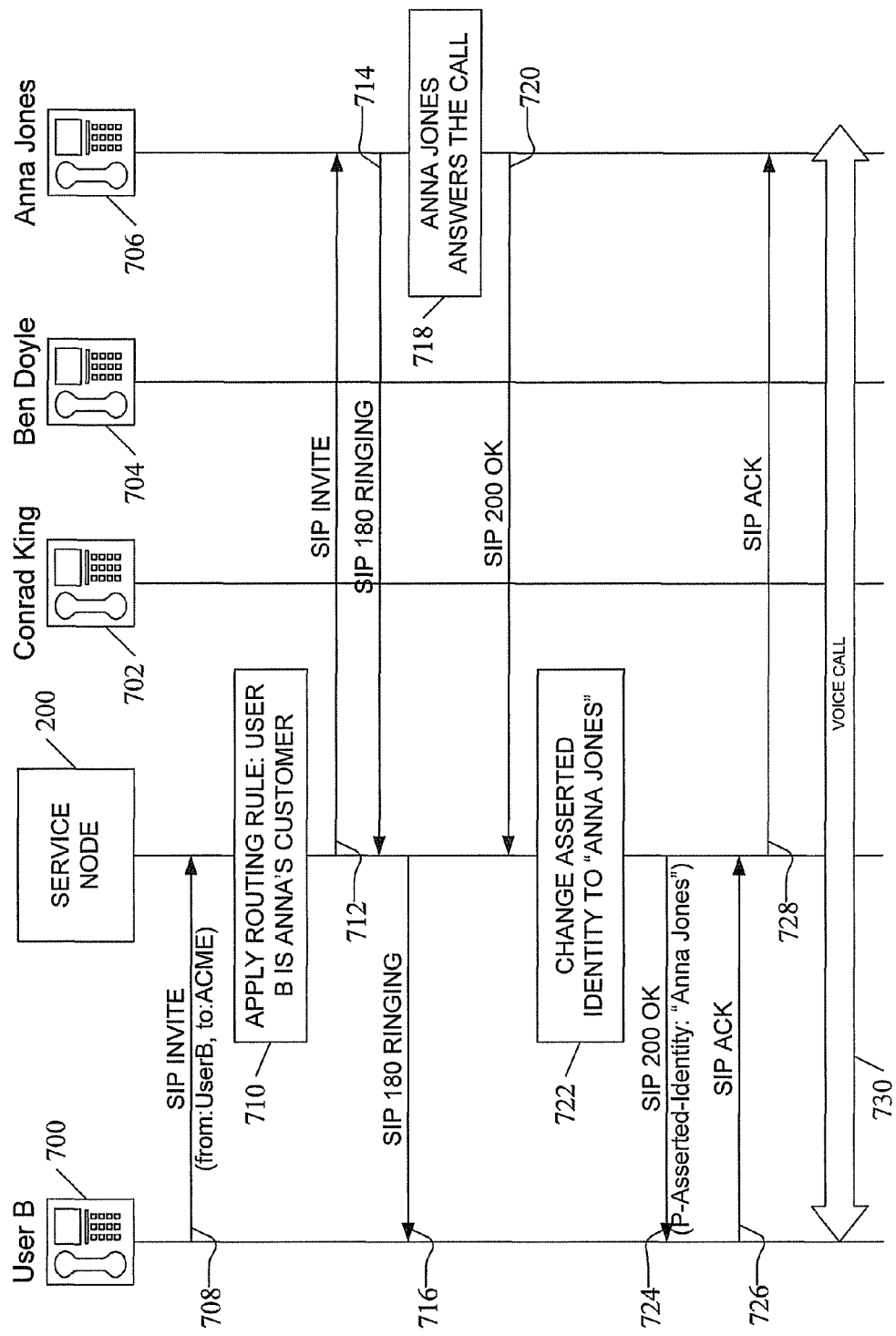
FIG. 7 is a message flow diagram showing exemplary signals exchanged between components of a system for providing SIP device-level call/session/service management according to another embodiment of the subject matter described herein.

FIG. 7 is a message flow diagram showing example signals exchanged between components of a system for providing SIP device-level management according to another embodiment of the subject matter described herein. FIG. 7 illustrates an embodiment in which user B uses a SIP device 700 to place a call to the main number of ACME, Incorporated, a small business with three employees who each have their own VoIP telephone. Conrad King uses SIP device 702, Ben Doyle uses SIP device 704, and Anna Jones uses SIP device 706. The process starts when user B's SIP device 700 sends a SIP INVITE message 708 to ACME. Service node 200 receives SIP INVITE message 708 and in block 710 applies a call management rule that determines that the caller is user B and routes the call to Anna Jones's telephone 706. Thus, service node 200 sends SIP INVITE message 712 to telephone 706, which responds with SIP 180 RINGING message 714. Service node 200 sends SIP 180 RINGING message 716 to user B's SIP device 700. At block 718, Anna Jones answers the call, and in response her telephone 706 sends a SIP 200 OK message 720 to service node 200. At block 722, service node 200 changes the asserted identity from "ACME" to "Anna Jones", and sends SIP 200 OK message 724 to user B's SIP device 700. In the embodiment illustrated in FIG. 7, service node 200 asserts the identity "Anna Jones" via the P-Asserted-Identity field in SIP 200 OK message 724. This causes the originator of the call to see "Anna Jones" as the called party rather than "Acme". User B's SIP device 700 responds with a SIP ACK message 726, which service node 200 forwards to telephone 706 as SIP ACK message 728. In this manner, a voice call 730 is established between user B's SIP device 700 and Anna Jones' SIP telephone 706.

One advantage of the subject matter described herein is that the identity owner can assign user-friendly nicknames to individual SIP devices and then create rules using those nicknames. There are several methods that may be used to associate a nickname to a particular SIP device, including but not limited to the processes described in FIGS. 9 through 10, below.

Figure 8:
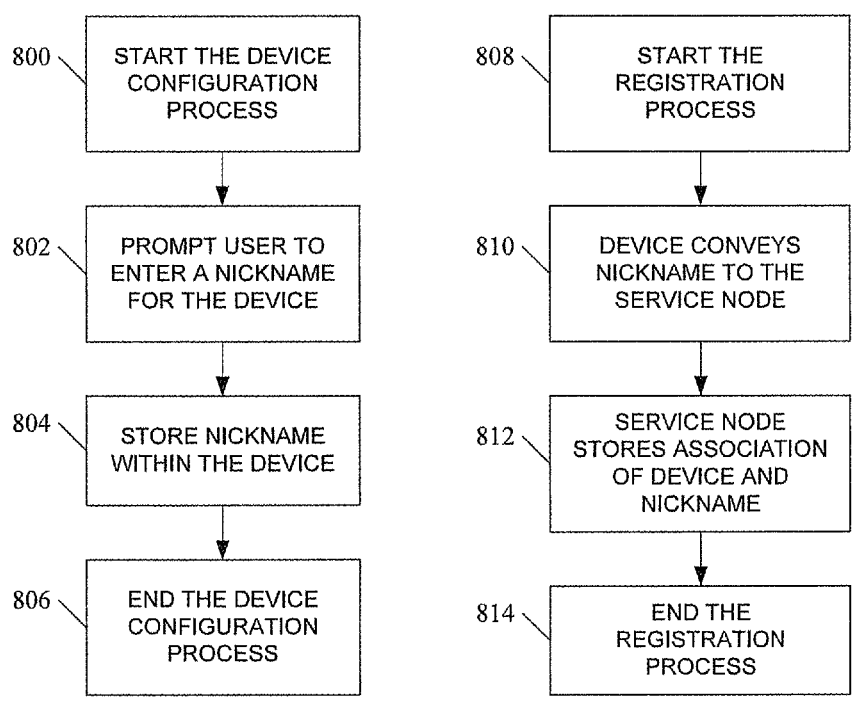
FIG. 8 is a flow chart illustrating an exemplary process for assigning a nickname to a device according to an embodiment of the subject matter described herein.

FIG. 8 is a flow chart illustrating an exemplary process for assigning a nickname to a device according to an embodiment of the subject matter described herein. In one embodiment, the nickname may be assigned to the SIP device as part of the device configuration process, e.g., when the device is purchased or acquired by a user. The configuration process may be performed by the service provider, the device user, the identity owner, etc. In the embodiment illustrated in FIG. 8, the device configuration process starts at block 800. Part of the configuration process may include block 802, in which the user is prompted for a nickname for the device. The user may provide the nickname, e.g., by entering the nickname using a keyboard on the device or via configuration software executing on a platform other than the SIP device, and at block 804 the nickname is stored within the device itself. At block 806, the device configuration, which may include other operations besides assignment of a nickname, continues to its completion, at which point the device is ready to join a network. At block 808, the device starts a SIP registration process with the SIP network. Referring to FIG. 4, for example, registration of wireline device 402 may be triggered when device 402, which may be a VoIP telephone, is connected to packet network 108 via an Ethernet cable. Likewise, registration of wireless device 404 may be triggered when wireless device 404 joins a wireless access network. As part of the SIP registration process, at block 810 the device conveys its nickname to service node 200, which stores the association of device ID and nickname at block 812. In one embodiment, the device ID may be a universally unique instance-id for each SIP user agent as defined in IETF RFC 5626. The instance ID stays the same for the device even if the device reboots or is subjected to a power cycle. The instance ID is contained within the "+sip.instance" parameter in the contact header field of the SIP REGISTER message sent from the device at SIP registration time. The registration process continues to its conclusion at block 814. At this point the service node knows the association between the particular device and that device's nickname, and can apply the management rules to that particular device.

Figure 9:
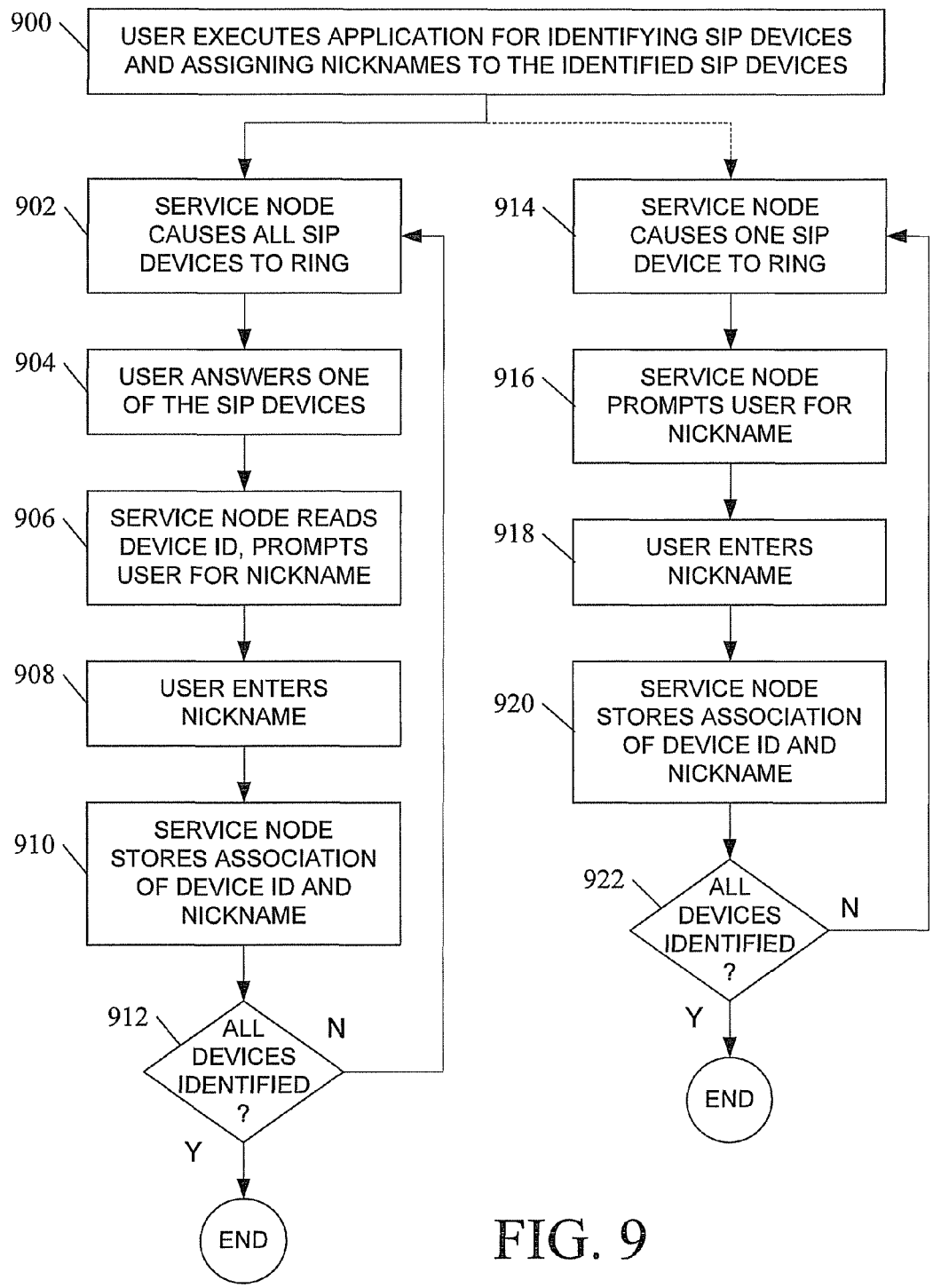
FIG. 9 is a flow chart illustrating an exemplary process for assigning a nickname to a device according to another embodiment of the subject matter described herein.

FIG. 9 is a flow chart illustrating an exemplary process for assigning a nickname to a device according to another embodiment of the subject matter described herein. At block 900, the user executes an application for identifying SIP devices and assigning nicknames to the identified SIP devices. Referring to FIG. 4, in one embodiment, the application may be hosted by service node 200 and accessed via the user's web browser running on personal computer 408, which connects to service node 200 through the user's internet connection 216. In another embodiment, the application may be hosted by the SIP device itself and may communicate with service node 200 via packet network 108 and/or internet connection 216.

At block 902, service node 200 causes all SIP devices associated with the user's SIP identity to ring, and at block 904, the user answers one of the SIP devices. For example, in the embodiment illustrated in FIG. 4, service node 200 may cause all three SIP devices 402, 404, and 406 to ring, and the user may answer home phone 402. At block 906, service node 200 detects that one of the devices has answered the call and records the device ID or other identifying information within the SIP messages sent from home phone 402 to service node 200 during the execution of this application or stored on service node 200 during a previous SIP registration. Service node 200 may then prompt the user to enter a nickname, which the user enters at block 908. At block 910, service node 200 stores the association of device ID and nickname, and the process ends. The process can be repeated for any of the SIP devices where a nickname is desired. For example, at block 912 service node determines if all SIP devices have been identified and assigned nicknames. If all SIP devices have been identified and assigned, the process ends. If there are SIP devices that have not yet been identified and assigned a nickname, the process returns to block 902, where service node 200 repeats the process by causing all devices to ring. This continues until all devices to which the user wants to assign a nickname have been identified and assigned a nickname.

In an alternative embodiment, instead of causing all SIP devices to ring, service node 200 may cause the SIP devices to ring one at a time until all devices are configured. This is illustrated in FIG. 9, where the dotted line goes from block 900 to block 914, in which service node 200 causes one SIP device to ring. In this embodiment, service node 200 knows the sip.instance of the devices from a previous SIP registration from each device. At block 916, service node 200 prompts the user for a nickname. It is not necessary for the user to answer the ringing SIP device, nor is it prohibited; in this embodiment, service node 200 may cause the SIP device to ring in order to help the user identify the device for which a nickname is being requested. At block 918 the user enters a nickname and at block 920 service node 200 stores the association of device ID and nickname. At block 922 service node determines if all SIP devices have been identified and assigned nicknames. If all SIP devices have been identified and assigned, the process ends. If there are SIP devices that have not yet been identified and assigned a nickname, the process returns to block 914, where service node 200 repeats the process by causing another device to ring. This continues until all devices to which the user wants to assign a nickname have been identified and assigned a nickname.

Figure 10:
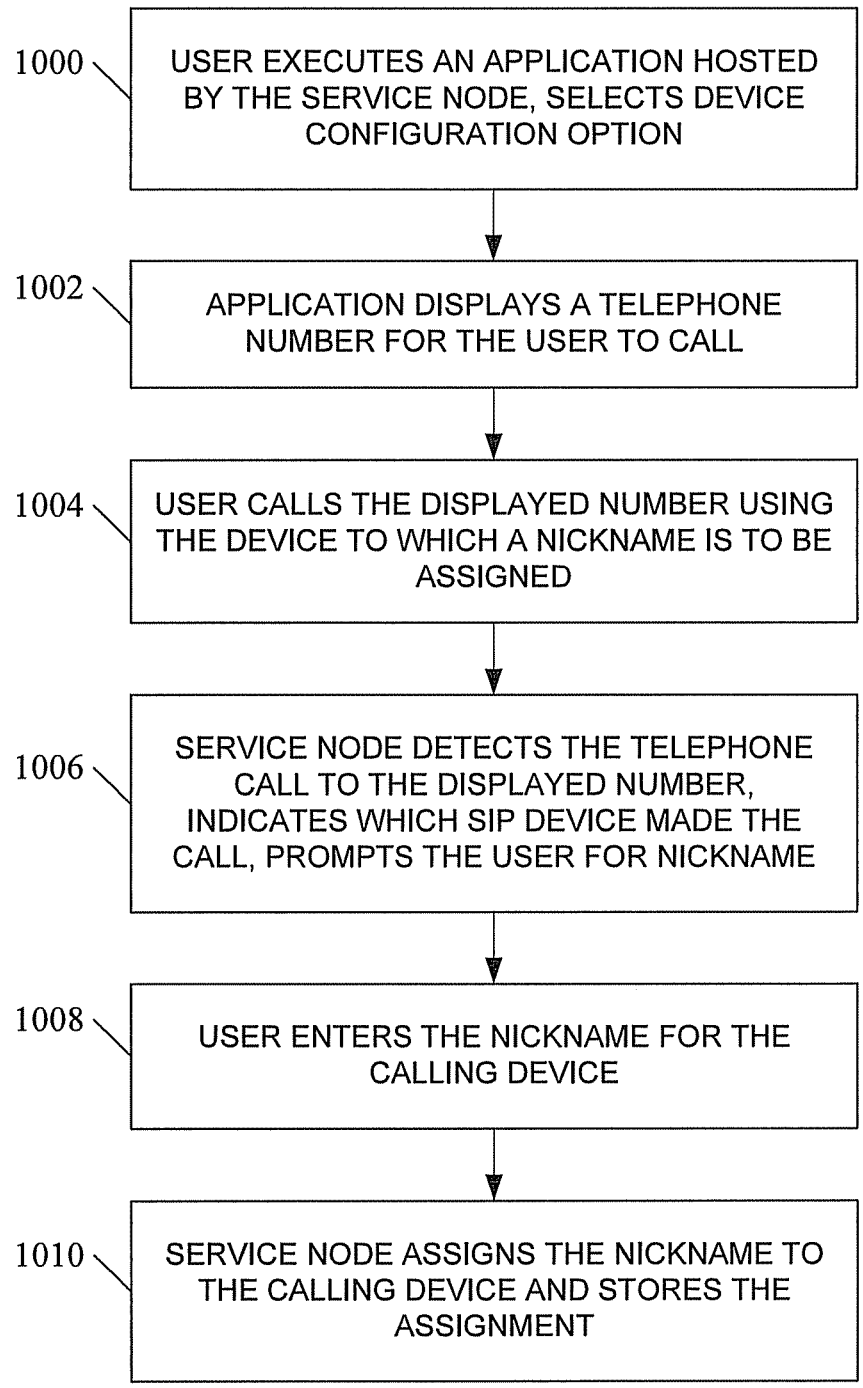
FIG. 10 is a flow chart illustrating an exemplary process for assigning a nickname to a device according to yet another embodiment of the subject matter described herein.

FIG. 10 is a flow chart illustrating an exemplary process for assigning a nickname to a device according to yet another embodiment of the subject matter described herein. At block 1000, in one embodiment, the user executes an application that is hosted by service node 200 and selects a "device configuration" option. In some embodiments, a device configuration page may be displayed that lists the SIP devices known to service node 200 to be associated with the owner's SIP identity, along with a currently assigned nickname, if any, for each device. Other embodiments may not present such information to the owner. At block 1002, service node 200 displays to the user a telephone number. In one embodiment, the telephone number is a special number reserved by service node 200, e.g., a telephone number or short code that is recognized only by service node 200. At block 1004, the user calls that number using the SIP device to which a nickname is to be assigned. At block 1006, service node 200 detects that a call is being placed to the displayed number and prompts the user to enter a nickname for that device. In some embodiments, service node 200 may highlight an entry in a displayed list of SIP devices known to be associated with the owner's SIP identity or otherwise indicate to the user which of the SIP devices is currently making the call. Other embodiments may not present such information to the owner. At block 1008, the user enters the nickname for the SIP device making the call, and at block 1010 service node assigns the entered nickname to the calling device and stores the assignment.

A similar process or processes may be used to allow a SIP identity owner or user to configure service node 200 with SIP device-level management rules. In the embodiment illustrated in FIG. 4, for example, the user or owner may access an application hosted by service node 200 via a web browser or other application hosted by the user's computer 408 or SIP device 402, either via packet network 108 or another network connection such as through Internet 216. The types of services that may be implemented using SIP device-level management rules and nicknames include, but are not limited to, the following:

Outgoing call screening rules. For example, outgoing long distance calls may be disabled from certain devices.

Incoming call screening rules. For example, calls from kids friends will cause only the kids phone to ring.

Time of Hour/Day/Week routing. For example, calls after midnight should only ring the parents phone or the phone in the master bedroom.

Enhanced Network Call Logs. For example, call logs can display which device placed a call or answered a call.

Enhanced Connected-ID. For example, the device nickname could be used as part of the caller/called party/connected-ID that is sent to the caller or displayed on caller-ID.

Enhanced presence. For example, the owner's presence status can display the phone they are currently using (e.g. "On the kitchen phone" instead of "On the phone").

Call Transfer between devices. For example, a user can invoke a directed call transfer to a specific device that shares the same SIP identity. For example, the user can now invoke a call transfer from their kitchen phone to their den phone. For devices that are restricted to dialing phone numbers, a short code could be associated with the nicknames.

For a small enterprise, the nicknames can refer to the individual employees and their respective terminals.

Calls routed for a specific device, if not answered, can be routed to an individualized voicemail box (e.g. calls for Anna Jones go to her voicemail rather than a global Acme voicemail box).

Similar type of rules can be setup for video calls, messaging, file transfer, etc.

Devices can include a mix of fixed and mobile devices (e.g. cellular phone) sharing a common SIP user ID. The user can set rules to route calls to his "Mobile" only between 9-5, and to the home phone during other hours.

The device level call management may be used for devices connecting over any access technology, e.g., WiFi™, worldwide interoperability for microwave access (WiMAX), and 3GPP long term evolution (LTE). Device level call management may be used for both IMS and non-IMS environments. Nicknames may be associated with a variety of device identifiers, including but not limited to the device's IMS private identity (IMPI), globally routable user agent URI (GRUU), or other forms of URI, etc. Nicknames may be associated with any form of device identifier, and thus may be used for devices or in systems that do not use GRUUs.

Figure 11:
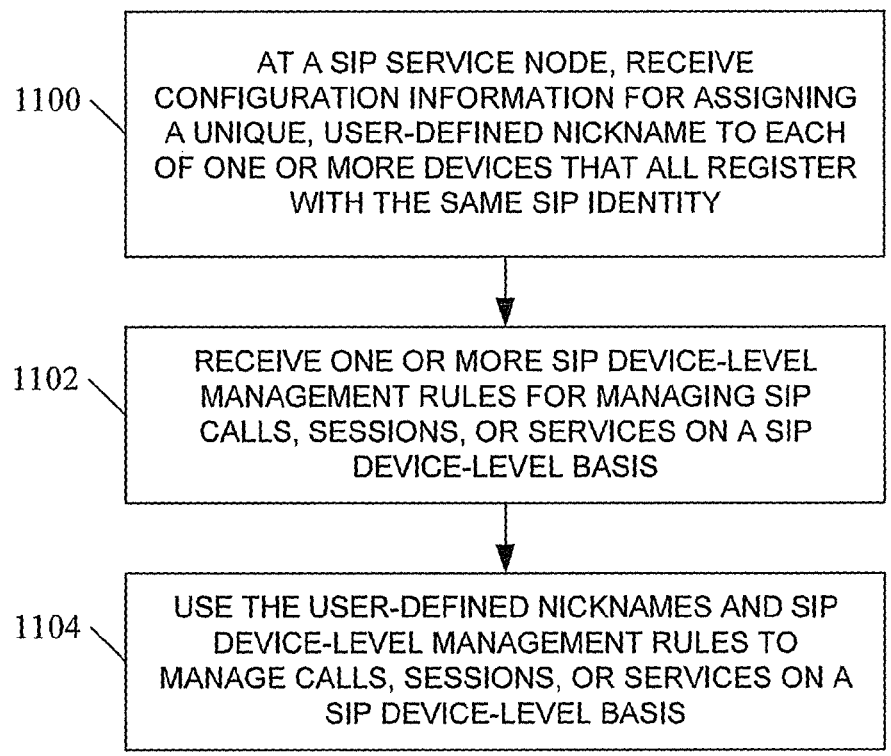
FIG. 11 is a flow chart illustrating an exemplary process for SIP device-level call/session/service management according to an embodiment of the subject matter described herein.

FIG. 11 is a flow chart illustrating an exemplary process for SIP device-level management according to an embodiment of the subject matter described herein. At block 1100, a SIP service node receives configuration information for assigning a unique, user-defined nickname to at least one of multiple devices that register with the same SIP identity. For example, service node 200 may be configured according to a process for assigning user-defined nicknames to multiple SIP devices that register with the same SIP identity including, but not limited to, the processes illustrated in FIGS. 8, 9, and 10 described above.

In one embodiment, the SIP service node may, depending on the service, also receive SIP device-level management rules for managing SIP calls/sessions/services on a SIP device-level basis. For example, at block 1102, service node 200 may be configured or programmed to implement rules including, but not limited to, the various rules for screening, routing, and logging described above.

At block 1104, the user-defined nicknames (and the SIP device-level management rules, if extant) are used to manage calls/sessions/services on a SIP device-level basis. For example, service node 200 may perform SIP device-level management as illustrated in, but not limited to, the scenarios illustrated in FIGS. 6 and 7.

In the embodiments described above, unique, user-defined nicknames are assigned to all SIP devices associated with a SIP identity, in a one nickname-to-one SIP device (i.e., a 1-to-1) relationship, but other embodiments are also contemplated. For example, in one embodiment, only some SIP devices (but not all) may be assigned a unique, user-defined nickname.

In one embodiment, a single SIP device may be assigned multiple nicknames, i.e., in a many-to-1 relationship. For example, a user's cell phone may have the nicknames "HomePhone" and "EmergencyContact". This allows separate routing rules for normal communications and emergency communications, such that changing the emergency contact, for example, can be performed merely by remapping the "EmergencyContact" nickname to another SIP device rather than having to rewrite a rule or ruleset.

In one embodiment, a single nickname may be used to refer to more than one SIP device, i.e., in a 1-to-many relationship. This allows the creation of rules that apply to groups, such as "If an incoming call is from Europe, ring all European Sales Staff telephones" or "If an incoming call is from South America, ring all South American Sales Staff telephones", etc. If the membership list of the European Sales Staff changes, only the nickname table entry for "EuropeanSalesStaff" need be updated, rather than having to rewrite all rules that apply to the European Sales Staff.

Likewise, a many-to-many relationship may be established, in which a SIP device may have many nicknames and in which a nickname may apply to multiple SIP devices.

A service node is not limited to providing device-level call management for just one SIP identity, but may provide device-level call management for multiple SIP identities, each SIP identity having one or more devices associated with that SIP identity. For example, service node 200 may include a call/session/service management rules table such as the following:

TABLE 8

Nickname Table for Multiple SIP Identies

| SIP identity | SIP Instance | Nickname |
|---|---|---|
| Acme@Domain | A | Conrad King |
| Acme@Domain | B | Ben Doyle |
| Acme@Domain | C | Anna Jones |
| . | . | . |
| . | . | . |
| . | . | . |
| Family@Domain | X | LivingRoom |
| Family@Domain | Y | MasterBedroom |
| Family@Domain | Z | KidsRoom |
| . | . | . |
| . | . | . |
| . | . | . |
| Owner@Domain | Q | HomePhone |
| Owner@Domain | R | Mobile |
| Owner@Domain | S | SoftClient |

Table 8, above, includes nicknames for three groups of SIP devices, each group of devices being associated with its own respective SIP identity. A rules database may likewise contain call management rules for more than one SIP identity. In one embodiment, service node 200 may receive an incoming call/session/service request directed to a particular SIP identity, and use the SIP identity as a parameter to query rules database 202 and/or nickname table 204. In this manner, a service node may provide device-level call management for multiple SIP identities.

It will be understood that various details of the subject matter described herein may be changed without departing from the scope of the subject matter described herein. Furthermore, the foregoing description is for the purpose of illustration only, and not for the purpose of limitation.

What is claimed is:

1. A system, comprising:
a session initiation protocol (SIP) service node having a processor and a memory coupled to the processor, the memory having program instructions stored thereon that, upon execution by the processor, cause the SIP service node to:
associate each of a plurality of SIP devices with a different SIP instance identifier, wherein each of the plurality of the SIP devices registers with the SIP service node using the same SIP Uniform Resource Identifier (URI) such that any of the plurality of SIP devices uses the same SIP URI but the SIP URI does not include any of the different SIP instance identifiers, wherein the different SIP instance identifiers are values used as contact header field parameters in SIP requests distinctly or separately from the SIP URI, and wherein each of the different SIP instance identifiers is associated with a corresponding user-defined nickname;
use the different SIP instance identifiers to manage calls, sessions, or services on a SIP device-level basis for any of the plurality of SIP devices based on SIP device-level management rules, wherein the SIP device-level management rules refer to the user-defined nicknames, wherein a SIP device-level management rule identifies at least one of the plurality of SIP devices to which the rule is to be applied using a corresponding one of the plurality of SIP instance identifiers;
detect signaling related to a call, session, or service that is associated with at least one of the plurality of SIP devices that register with the SIP service node using the same SIP URI;
determine whether the SIP device-level management rule applies to the at least one SIP device; and
in response to a determination that the SIP device-level management rule applies to the at least one SIP device, apply the rule to the call, session, or service with respect to the at least one SIP device using at least one SIP instance identifiers associated with the at least one SIP device.

2. The system of claim 1, wherein using the different SIP instance identifiers includes logging a given one of the plurality of SIP device's activity.

3. The system of claim 1, wherein the SIP device-level management rule is received from a user.

4. The system of claim 1, wherein the program instructions, upon execution by the processor, further cause the SIP service node to:
determine whether signaling related to a call, session, or service is associated with at least one of the plurality of SIP devices that register with the SIP service node using the same SIP URI; and upon a determination that the signaling is associated with the at least one of the plurality of SIP devices that register with the SIP node using the same SIP URI, perform, using at least one SIP instance identifier associated with the at least one SIP device, at least one of: a screening operation, a routing operation, or a logging operation.

5. The system of claim 1, wherein managing calls, sessions, or services on a SIP device-level basis for the plurality of SIP devices includes using the user-defined nicknames.

6. The system of claim 5, wherein receiving the configuration information occurs during a registration process for registering each of the plurality of SIP devices to the SIP service node.

7. The system of claim 5, wherein to receive the configuration information, the program instructions, upon execution by the processor, further cause the SIP service node to:
communicate with each of the plurality of SIP devices;
prompt a user to enter a nickname for each of the plurality of SIP devices;
receive from the user a nickname for each of the plurality of SIP devices; and
store an association between a SIP instance identifier and the nickname for each of the plurality of SIP devices.

8. The system of claim 7, wherein to communicate with each of the plurality of SIP devices, the program instructions, upon execution by the processor, further cause the SIP service node to:
cause two or more of the plurality of SIP devices to generate an alert, detect that one of the two or more of the plurality of SIP devices has been answered by a user, and determine the SIP instance identifier of the one of the two or more of the plurality of SIP devices that has been answered by the user;
select one of the plurality of SIP devices and causing the selected SIP device to generate an alert; or
detect that a user has called a telephone number for configuring a SIP device and determining the SIP instance identifier of the SIP device that was used to make the call.

9. The system of claim 7, wherein the program instructions, upon execution by the processor, further cause the SIP service node to indicate to the user the SIP instance identifier of the SIP device to which the nickname will apply.

10. The system of claim 1, wherein the program instructions, upon execution by the processor, further cause the SIP service node to provide the user-defined nickname associated with one of the plurality of SIP devices to another party in a call with the one of the plurality of SIP devices.

11. A method for session initiation protocol (SIP) device-level management, the method comprising:
at a SIP service node:
associating each of a plurality of SIP devices with a different SIP instance identifier, wherein each of the plurality of the SIP devices registers with the SIP service node using the same SIP identity such that any of the plurality of SIP devices uses the same SIP identity but the SIP identity does not include any of the different SIP instance identifiers, wherein each of the different SIP instance identifiers is a value used as a contact header field parameter in a SIP message distinctly or separately from the SIP identity, and wherein each SIP instance identifier is associated with a user-defined nickname for a corresponding SIP device;
using the different SIP instance identifiers to manage calls, sessions, or services on a SIP device-level basis for any of the plurality of SIP devices based on SIP device-level management rules, wherein the SIP device-level management rules refer to the user-defined nicknames, wherein a SIP device-level management rule identifies at least one of the plurality of SIP devices to which the rule is to be applied using a corresponding one of the plurality of SIP instance identifiers;
detecting signaling related to a call, session, or service that is associated with at least one of the plurality of SIP devices that register with the SIP service node using the same SIP URI;
determining whether the SIP device-level management rule applies to the at least one SIP device; and
in response to a determination that the SIP device-level management rule applies to the at least one SIP device, applying the rule to the call, session, or service with respect to the at least one SIP device using at least one SIP instance identifiers associated with the at least one SIP device.

12. The method of claim 11, wherein using the different SIP instance identifiers to manage calls, sessions, or services on a SIP device-level basis includes logging SIP device activity.

13. The method of claim 11, wherein receiving the SIP device-level management rule comprises receiving the SIP device-level management rule from a user.

14. The method of claim 11, wherein using the rule to manage calls on a SIP device-level basis includes:
determining whether the signaling related to a call, session or service is associated with at least one of the plurality of SIP devices that register using the same SIP identity; and
upon a determination that signaling related to a call, session, or service is associated with at least one of the plurality of SIP devices that register using the same SIP identity, performing at least one of: a screening operation, a routing operation, or a logging operation.

15. The method of claim 11, comprising receiving configuration information for assigning a unique, user-defined nickname to a given SIP device, wherein using the SIP instance identifier to manage calls, sessions, or services on a SIP device-level basis includes using the user-defined nickname to manage calls, sessions, or services on a SIP device-level basis.

16. The method of claim 15, wherein receiving configuration information for assigning a unique, user-defined nickname to the given SIP device includes receiving, from the given SIP device, a nickname that has been assigned to the given SIP device during a configuration process of the given SIP device, wherein the nickname is received from the given SIP device during a registration process for registering the given SIP device to the SIP service node.

17. The method of claim 15, wherein receiving configuration information for assigning a unique, user-defined nickname to the given SIP device includes:
communicating with the given SIP device;
prompting a user to enter a nickname for the given SIP device;
receiving from the user a nickname for the given SIP device; and
storing the association of the SIP instance identifier of the given SIP device and the nickname for the given SIP device.

18. The method of claim 17, wherein communicating with one of the plurality of devices includes at least one of:
causing at least some of the plurality of SIP devices that register using the same SIP identity to generate an alert, detecting that one of the plurality of SIP devices has been answered by a user, and determining the identity of the SIP device that has been answered by the user;

selecting one of the plurality of SIP devices that register using the same SIP identity and causing the selected device to generate an alert; or detecting that a user has called a telephone number for configuring a SIP device and determining the identity of the SIP device that was used to make the call.

19. The method of claim 17, wherein prompting the user to enter a nickname for the SIP device includes indicating to the user the identity of the device to which the nickname will apply.

20. The method of claim 11, wherein using the at least one user-defined nickname to manage calls, sessions, or services on a SIP device-level basis includes presenting the user-defined nickname to another party in a call with the SIP device.

21. A non-transitory computer readable medium having stored thereon executable instructions that, when executed by a processor of a computer, cause the computer to:

at a session initiation protocol (SIP) service node:

associate each of a plurality of SIP devices with a different SIP instance identifier, wherein each of the plurality of the SIP devices registers with the SIP service node using the same SIP identity such that any of the plurality of SIP devices uses the same SIP identity but the SIP identity does not include any of the different SIP instance identifiers, wherein each of the different SIP instance identifiers is a value used as a contact header field parameter in a SIP message distinctly or separately from the SIP identity, and wherein each SIP instance identifier is associated with a user-defined nickname for a corresponding SIP device;

use the different SIP instance identifiers to manage calls, sessions, or services on a SIP device-level basis for any of the plurality of SIP devices based on SIP device-level management rules, wherein the SIP device-level management rules refer to the user-defined nicknames, wherein a SIP device-level management rule identifies at least one of the plurality of SIP devices to which the rule is to be applied using a corresponding one of the plurality of SIP instance identifiers;

detect signaling related to a call, session, or service that is associated with at least one of the plurality of SIP devices that register with the SIP service node using the same SIP URI;

determine whether the SIP device-level management rule applies to the at least one SIP device; and in response to a determination that the SIP device-level management rule applies to the at least one SIP device, apply the rule to the call, session, or service with respect to the at least one SIP device using at least one SIP instance identifiers associated with the at least one SIP device.

* * * * *